US010815418B2

(12) United States Patent
Sangaru et al.

(10) Patent No.: US 10,815,418 B2
(45) Date of Patent: Oct. 27, 2020

(54) VES FLUIDS HAVING IMPROVED RHEOLOGY AT HIGH TEMPERATURE AND HIGH SALINITY

(71) Applicants: Shiv Shankar Sangaru, Odisha (IN); Prahlad Yadav, The Woodlands, TX (US)

(72) Inventors: Shiv Shankar Sangaru, Odisha (IN); Prahlad Yadav, The Woodlands, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 111 days.

(21) Appl. No.: 15/876,255

(22) Filed: Jan. 22, 2018

(65) Prior Publication Data
US 2019/0225874 A1 Jul. 25, 2019

(51) Int. Cl.
*C09K 8/68* (2006.01)
*C09K 8/60* (2006.01)
*C09K 8/66* (2006.01)

(52) U.S. Cl.
CPC .............. *C09K 8/68* (2013.01); *C09K 8/604* (2013.01); *C09K 8/665* (2013.01); *C09K 2208/30* (2013.01)

(58) Field of Classification Search
CPC ........ C09K 8/68; C09K 8/74; C09K 2208/30; C09K 8/685; C09K 8/88; C09K 8/90; C09K 2208/28; C09K 8/882; C09K 8/035; C09K 8/467; C09K 8/12; C09K 8/536; C09K 2208/32; C09K 8/62; C09K 8/86; C09K 8/03; C09K 8/502; C09K 8/516; C09K 8/64; C09K 8/82; C09K 2208/08; C09K 8/487; C09K 8/506; C09K 8/508; C09K 8/588; C09K 8/70; C09K 2208/00; C09K 2208/12; C09K 2208/18; C09K 8/04; C09K 8/22; C09K 8/40; C09K 8/42; C09K 8/5083; C09K 8/52; C09K 8/584; C09K 8/76; C09K 8/80; C09K 8/92; C09K 2208/10; C09K 2208/26; C09K 8/604; C09K 8/72; C09K 8/845; C09K 8/887; C09K 8/10; C09K 8/602; C09K 8/665; C09K 8/725; C09K 8/805; C09K 8/905; C09K 2208/22; C09K 2208/24; C09K 8/00; C09K 8/20; C09K 8/206; C09K 8/24; C09K 8/44; C09K 8/5045; C09K 8/512; C09K 8/514; C09K 8/524; C09K 8/528; C09K 8/56; C09K 8/5753; C09K 8/605; C09K 8/706; C09K 8/885; E21B 43/26; E21B 43/267; E21B 43/16; E21B 33/13; E21B 33/138; E21B 37/00; E21B 43/04; E21B 43/25
See application file for complete search history.

(56) References Cited

U.S. PATENT DOCUMENTS

| | | | |
|---|---|---|---|
| 7,144,744 | B2 | 12/2006 | Qu et al. |
| 7,879,767 | B2 | 2/2011 | Baycroft et al. |
| 9,022,111 | B2 | 5/2015 | Phatak et al. |
| 9,303,203 | B2 | 4/2016 | Drochon et al. |
| 2005/0037928 | A1 | 2/2005 | Qu et al. |
| 2011/0256085 | A1* | 10/2011 | Talingting Pabalan ...................... A61K 8/042 424/70.13 |
| 2015/0060072 | A1* | 3/2015 | Busby ....................... C09K 8/90 166/294 |

FOREIGN PATENT DOCUMENTS

| WO | 2012160008 A1 | 11/2012 |
|---|---|---|
| WO | WO 2017/074304 | * 5/2017 |

OTHER PUBLICATIONS

Cadix, et a; "A New Class of Associative Polymer for Hydraulic Fracturing Applications"; SPE-174210-MS; 2015; Society of Petroleum Engineers; 21 pages.
Comma, et al.; "Viscoelastic Behavior and Proppant Transport Properties of a New Associates Polymer-Based Fracturing Fluid"; SPE168113; 2014; Society of Petroleum Engineers; 17 pages.
Gupta, et al.;"Associative Polymer System Extends the Temperature Range of Surfactant Gel Frac Fluids"; SPE 141260; 2011 Society of Petroleum Engineers; 8 pages.
Hornof,et al.; "Viscosity of Surfactant-Polymer Solutions";SPE11775; 1983; Society of Petroleum Engineers of Aime; 8 pages.
Jiang, et al.; "Supramolecular-Structure-Associating Weak Gel of Wormlike Micelles of Erucoylamidopropyl Hydroxy Sulfobetaine and Hydrophobically Modified Polymers"; Energy & Fuels; 2017; American Chemical Society Publications; 11 pages.
Massiera, et al.; "Hairy Wormlike Micelles: Structure and Interactions"; 2002; Langmuir, vol. 18, No. 15; American Chemcial Society; 8 pages.
Shaefer, et al.; "New Thermo Thickening Associative Polymer System Pushes Limits of Surfactant Gels"; SPE 140120; 2011; Society of Petroleum Engineers; 7 pages.

(Continued)

*Primary Examiner* — Kumar R Bhushan
(74) *Attorney, Agent, or Firm* — Cantor Colburn LLP

(57) ABSTRACT

A viscoelastic surfactant treatment fluid comprises an aqueous base fluid an inorganic salt, the inorganic salt being present in an amount of greater than about 5 wt. % based on the total weight of the treatment fluid; a viscoelastic surfactant gelling agent effective to gel the aqueous base fluid by forming a plurality of micelles; and a cationic polymer additive associated with the micelles via electrostatic interactions.

14 Claims, 3 Drawing Sheets

(56) References Cited

OTHER PUBLICATIONS

Shashkina, et al; "Rheology of Viscoelastic Solutions of Cationic Surfactant. Effect of Added Associating Polymer"; 2005; Langmuir; vol. 21, No. 4; American Chemical Society; 7 pages.
Van Zanten, Ryan; "Stabilizing Visoelastic Surfactants in High-Density Brines"; 2011; Society of Petroleum Engineers; 7 pages.
Yang, et al.; "Supramolecular Fluid of Associative Polymer and Viscoelastic Surfactant for Hydraulic Fracturing"; Society of Petroleum Engineers (2016) 7 pages.

* cited by examiner

VES FLUIDS HAVING IMPROVED RHEOLOGY AT HIGH TEMPERATURE AND HIGH SALINITY

BACKGROUND

Viscoelastic surfactants (VES), due to their gelling properties in aqueous solutions, are an important class of materials used in several industrial applications such as gravel-packing, frac-packing and fracturing fluids. Because VES is a relatively expensive material, different approaches have been used to improve the rheological properties of VES fluids with less VES loading. Addition of certain polymers is one such approach. However, while some polymer additives can improve the rheological properties of VES fluids at low temperature and low salinity, many polymer additives have limited influence on the rheology of VES fluids having high salinity such as those prepared with sea water. In addition, some polymer additives are not effective to improve the rheological properties of VES fluids at high temperatures such as 300° F. Accordingly, there remains a need in the art for alternative materials and methods to improve the rheological properties of VES fluids at high temperature and/or high salinity.

BRIEF DESCRIPTION

A viscoelastic surfactant treatment fluid comprises an aqueous base fluid comprising an inorganic salt, the inorganic salt being present in an amount of greater than about 5 wt. % based on the total weight of the treatment fluid; a viscoelastic surfactant gelling agent effective to gel the aqueous base fluid by forming a plurality of micelles; and a cationic polymer additive associated with the micelles via electrostatic interactions.

A method of improving a rheological property of a viscoelastic surfactant treatment fluid comprises gelling an aqueous base fluid having greater than about 5 wt. % of an inorganic salt with a viscoelastic surfactant gelling agent to form a plurality of micelles; and contacting the plurality of micelles with a cationic polymer additive to form a viscoelastic surfactant treatment fluid having an improved rheological property at a temperature of greater than about 200° F. as compared to an otherwise identical reference viscoelastic surfactant treatment fluid that does not contain the cationic polymer additive.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
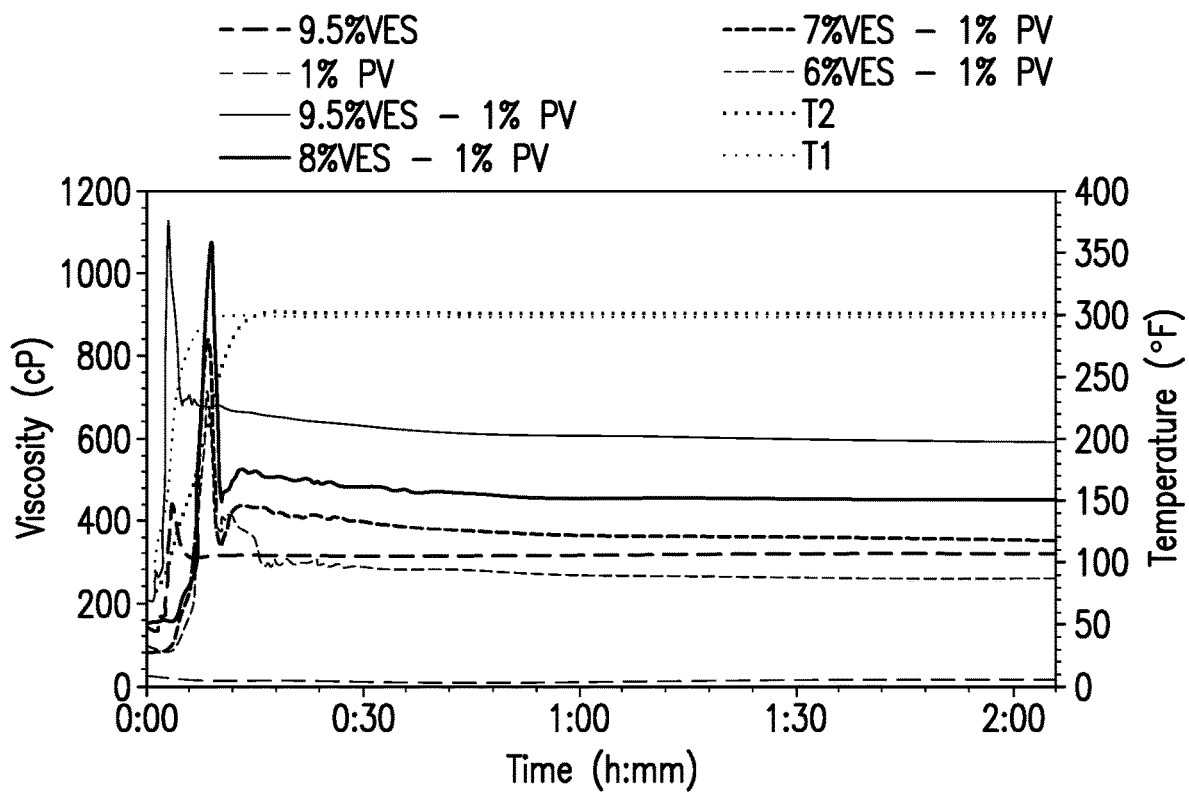
FIG. 1 is a graph illustrating the viscosity profiles of VES fluids containing 30 wt. % of $CaCl_2$ in sea water and (a) 9.5 wt. % of a VES surfactant, (b) 1 wt. % of a cationic polymer additive, or (c) different concentrations of a VES surfactant along with 1 wt. % the cationic polymer additive, measured at 300° F. under constant shear rate of 100 1/s.

The inventors hereof have discovered that a significant improvement in the rheological property of a VES fluid comprising micelles with negative charges and optionally compensated or non-compensated positive charges on a surface of the micelles can be achieved by using a cationic polymer additive. In particular, the inventors have found that a cationic polymer additive such as an amine, an amide, or a salt thereof can synergistically improve the rheological properties of a VES fluid comprising micelles with negative charges and optional positive charges on a surface of the micelles at high temperature and/or high salinity.

Specifically, the cationic polymer additive by itself has comparatively low viscosity with an aqueous base fluid having a high salinity at low concentrations, yet the same amount of the cationic polymer additive can significantly enhance the viscosity of an aqueous based fluid gelled with a viscoelastic gelling agent. In addition, the viscoelastic surfactant fluids comprising the cationic polymer additive have stable viscosity at a high temperature such as 300° F. The viscoelastic surfactant fluids disclosed herein are also very tolerant to high salinity brines. Hence it is feasible to use seawater and produced water for the viscoelastic fluid formulations.

The discovery allows the manufacture of viscoelastic surfactant based treatment fluids (also referred to as "treatment fluids" or "VES fluids" herein) having improved rheological properties at lower VES loadings. Since the viscoelastic surfactants are relatively more expensive, the use of small amount of a cationic polymer additive as disclosed herein can reduce the total cost of the gelled fluids and the total chemical loading particularly the VES surfactant loading in the treatment fluids.

The viscoelastic surfactants useful herein include, but are not necessarily limited to, non-ionic, amphoteric, and zwitterionic surfactants. These surfactants can be used either alone or in combination with other surfactants to create ordered structures, commonly referred to as micelles, which result in increased viscosity of aqueous base fluids. The viscoelastic surfactants have a hydrophilic head group and a hydrophobic tail. The molecules in a micelle organized in such a way that the hydrophilic head group is the outermost part of the micelle and the hydrophobic tail group is inside the micellar surface. In particular, suitable viscoelastic surfactants for the VES fluids disclosed herein are effective to gel aqueous base fluid disclosed herein by forming micelles. The micelles have negative charges on the surface thereof. The micelles can also have compensated or uncompensated positive charges. Compensated means neutralized, for example, at the pH of the treatment fluids.

Specific examples of zwitterionic/amphoteric surfactants include, but are not necessarily limited to, dihydroxyl alkyl glycinate, alkyl ampho acetate or propionate, alkyl betaine, alkyl amidopropyl betaine and alkylimino mono- or di-propionates derived from certain waxes, fats and oils.

Betaines are typically zwitterionic. When the surfactant is zwitterionic, it can be associated with both negative and positive counterions, for example, Cl⁻ and Na⁺ or K⁺. In an embodiment, the viscoelastic surfactants include erucamidopropyl hydroxypropyl sulfobetaine, erucamidopropyl hydroxyethyl sulfobetaine, erucamidopropyl hydroxymethyl sulfobetaine, or a combination comprising at least one of the foregoing. Erucamidopropyl hydroxypropyl sulfobetaine, also known as erucamido hydroxysultaine, is specifically mentioned. The viscoelastic surfactants may be used in conjunction with organic additives such as phthalic acid, salicylic acid or their salts.

In the treatment fluids, the viscoelastic surfactant is present in an amount of about 1 volume % to about 20 volume %, or about 5 volume % to about 15 volume %, or about 5 volume % to about 10 volume %, or about 6 volume % to about 9 volume % based on the total volume of the aqueous base fluid.

As used herein, the cationic polymer additive is not a viscoelastic surfactant and it does not gel the aqueous based fluid by forming micelles by itself. Interestingly, cationic polymer additives as disclosed herein can be associated with the micelles via electrostatic interactions thus stabilizing the micelles of VES fluids and improving the rheological properties of the VES fluids.

The cationic polymer additives have a weight average molecular weight of greater than about 10,000 Daltons, or greater than about 100,000 Daltons, for example greater than about 250,000 Daltons, or about 300,000 Daltons to about 500,000 Daltons, determined by gel permeation chromatography (GPC), using a crosslinked styrene-divinylbenzene column.

The cationic polymer additives comprise one or more of an amide or an amine or a salt thereof. In an embodiment, the cationic polymer additive is a homopolymer or copolymer of a polyallylamine salt. In another embodiment the cationic polymer additive is a homopolymer or copolymer of a polydiallydialkylammonium salt such as polydiallyldimethylammonium salt having repeating units of the formula

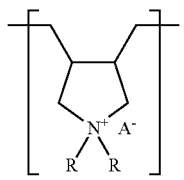

wherein each occurrence of R is independently a $C_{1-5}$ alkyl, A⁻ is an anion such as Cr. Preferably R is methyl and A⁻ is Cl⁻.

In the treatment fluids, the amount of the cationic polymer additive is about 0.1 wt. % to about 10 wt. %, 0.1 wt. % to about 7 wt. %, about 0.1 wt. % to about 5 wt. %, or about 0.1 wt. % to about 3 wt. %, each based on the total weight of the VES treatment fluid.

The aqueous base fluid comprises of a salt. Exemplary salts include KCl, NaCl, $ZnCl_2$, $MgCl_2$, KBr, NaBr, $CaBr_2$, $ZnBr_2$, $NH_4Cl$, potassium formate, sodium formate, cesium formate, and the like. A calcium salt such as calcium chloride is specifically mentioned. In an example, the aqueous base fluid is used in such an amount that the VES treatment fluids comprise greater than about 5 wt. %, about 5 wt. % to about 50 wt. %, or about 10 wt. to about 50 wt. %, specifically about 15 wt. % to about 40 wt. %, and more specifically about 20 wt. % to about 40 wt. % of a salt such as calcium chloride, based on the total weight of the VES treatment fluids. The aqueous base fluid can include a seawater, produced water, completion brine, or a combination thereof. Seawater, as an example, contains numerous constituents such as sulfate, bromine, and trace metals, beyond typical halide-containing salts. In some embodiments, produced water is water extracted from a production reservoir (e.g., hydrocarbon reservoir) or produced from the ground. Produced water also is referred to as reservoir brine and contains components such as barium, strontium, and heavy metals.

Water soluble solvents can also be included in the aqueous base fluid. Exemplary water soluble solvents include but are not limited to methanol, ethanol, propanol, butanol, ethylene glycol, propylene glycol, polyethylene glycol, polypropylene glycol, isomers thereof, or a combination comprising at least one of the foregoing.

The VES treatment fluids disclosed herein have a relatively high viscosity at high temperatures. In an embodiment, the treatment fluids have a viscosity of about 50 to about 350 cP or about 250 to about 350 cP at 300° F. and 100 s⁻¹ determined using Chandler 5550 HPHT viscometer in accordance with API RP 13M.

The treatment fluids disclosed herein also have improved stability at a temperature of greater than about 250° F., for example at 300° F. In an embodiment, the viscosity of the treatment fluid changes less than 10% after exposing to an environment having a temperature of about 250° F. to about 350° F. for two hours.

A method of improving a rheological property of a viscoelastic surfactant treatment fluid comprises gelling an aqueous base fluid having greater than about 5 wt. % of an inorganic salts with a viscoelastic surfactant gelling agent to form a plurality of micelles having negative changes and optionally positive charges on a surface of the micelles; and contacting the plurality of micelles with a cationic polymer additive to form a viscoelastic surfactant treatment fluid having an improved rheological property at a temperature of greater than about greater than 200° F. as compared to an otherwise identical reference viscoelastic surfactant treatment fluid that does not contain the cationic polymer additive.

The treatment fluids as described herein have use in fracturing fluids, completion fluids, gravel pack fluids, fluid loss pills, lost circulation pills, diverter fluids, foamed fluids, stimulation fluids and the like. The treatment fluids can be a liquid or a foam, where air, nitrogen, carbon dioxide, natural gas and the like is used for the gas phase. A method of treating a subterranean formation penetrated by a well comprises: forming a treatment fluid; and pumping the treatment fluid into the well.

The treat fracturing fluids can be made in a variety of ways. According to an embodiment, a process for making the treatment fluids includes combining an aqueous base fluid, a viscoelastic surfactant gelling agent, and the cationic polymer additive as disclosed herein. Combining the components of the treatment fluids is accomplished in a vessel such as a mixer, blender, and the like. Alternatively or in addition, the fluids are injected without mixing, e.g. the components are combined as the treatment fluid is being disposed downhole.

The disclosure will be further described with respect to the following Examples which are not meant to be limiting, but rather to further illustrate the various embodiments.

EXAMPLES

Preparation of Samples

Samples were prepared by mixing a VES surfactant (GBW-300 from Baker Hughes, a GE company, LLC, hereinafter "VES"), $CaCl_2$), and optionally a polydiallyldimethylammonium chloride polymer (cationic polymer additive, also referred to as "PV") in sea water. The amount of VES is volume percent based on the total volume of the sea water. The amounts of the cationic polymer and the calcium chloride are weight percent based on the total weight of the samples.

Testing Procedures

The viscosity of each sample was measured after 1 hour at 300° F. and 100 1/s shear rate using Chandler 5550 HPHT viscometer in accordance with API RP 13M.

Examples 1-6

Figure 2:
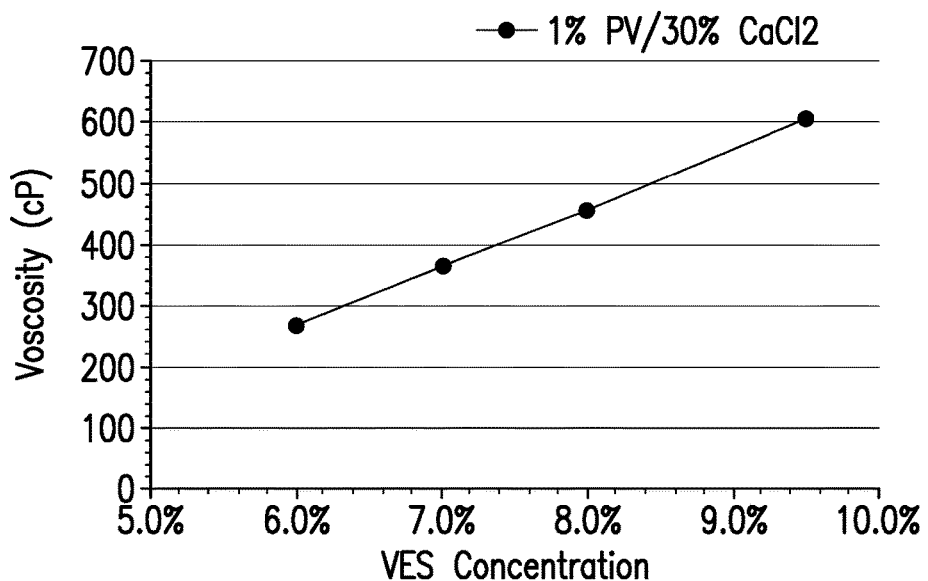
FIG. 2 shows the effect of the amount of VES surfactant on the viscosity of fluids containing the VES surfactant, 1 wt. % of a cationic polymer additive, and 30 wt. % of $CaCl_2$ in sea water, measured at 300° F. under constant shear rate of 100 1/s.

Examples 1-6 show the synergistic effect achieved by using a VES surfactant and a cationic polymer additive. These examples also show the effect of VES surfactant concentration on the viscosity of the fluids. The formulations and the results are shown in Table 1. The results are also illustrated graphically in FIG. 1 and FIG. 2.

TABLE 1

|  | VES (vol. %) | Cationic polymer additive (wt. %) | $CaCl_2$ (wt. %) | Viscosity (cP) |
|---|---|---|---|---|
| CEx 1 | 9.5 | 0 | 30 | 318 |
| CEx 2 | 0 | 1 | 30 | 12 |
| Ex 3 | 9.5 | 1 | 30 | 607 |
| Ex 4 | 8 | 1 | 30 | 455 |
| Ex 5 | 7 | 1 | 30 | 366 |
| Ex 6 | 6 | 1 | 30 | 270 |

The data shows that a VES fluid containing 30 wt. % $CaCl_2$) and 1 wt. % cationic polymer additive but no VES in sea water has a viscosity of approximately 12 cP at 300° F. (CEx 2). The results indicate that the cationic polymer additive itself does not show any appreciable gelling behavior when used in the indicated amounts. However, when 1 wt. % of the same cationic polymer additive is used together with 9.5 wt. % of VES, significant improvement in viscosity is observed (Ex 3, 607 cP) compared to the fluid containing the VES but not the cationic polymer additive (CEx 1, 12 cP) or the fluid containing the cationic polymer additive but not the VES (CEx 2, 318 cP), when tested under the same conditions. Clearly a strong synergistic effect is shown between the VES and the cationic polymer additive even at high temperature and high salinity.

For further analysis, the concentration of the VES in the fluid was decreased from 9.5 wt. % to 6 wt. %, keeping the amount of the cationic polymer additive constant at 1 wt. %. With 7 wt. % VES, the obtained viscosity was higher than that achieved with base VES fluid comprising of 9.5 wt. % VES formulation but without the cationic polymer additive. VES fluid with 6 wt. % VES formulation and a cationic polymer additive had slightly lower viscosity than the base VES fluid.

Examples 7-9

Figure 3:
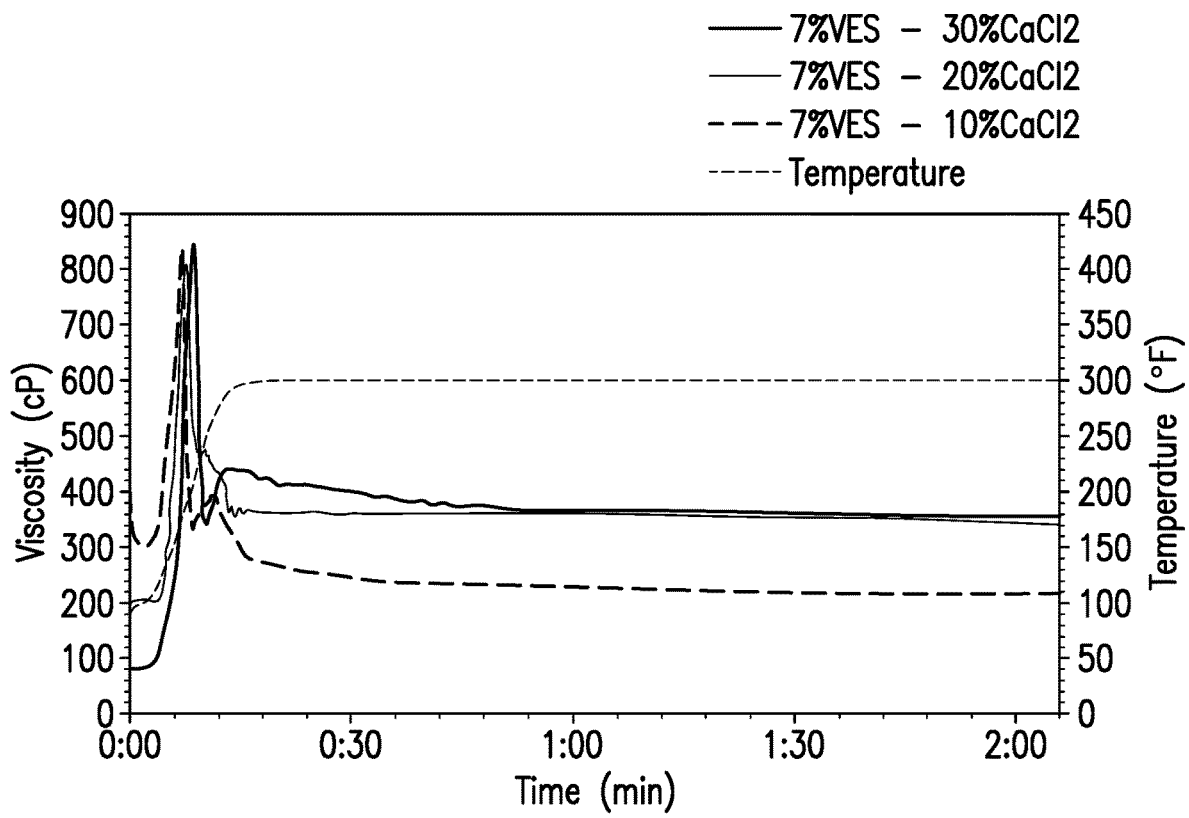
FIG. 3 is a graph illustrating the viscosity profiles of fluids containing 7 wt. % of a VES surfactant, 1 wt. % of cationic polymer additive, and 10 to 30 wt. % of $CaCl_2$) in sea water, measured at 300° F. under constant shear rate of 100 1/s.
Figure 4:
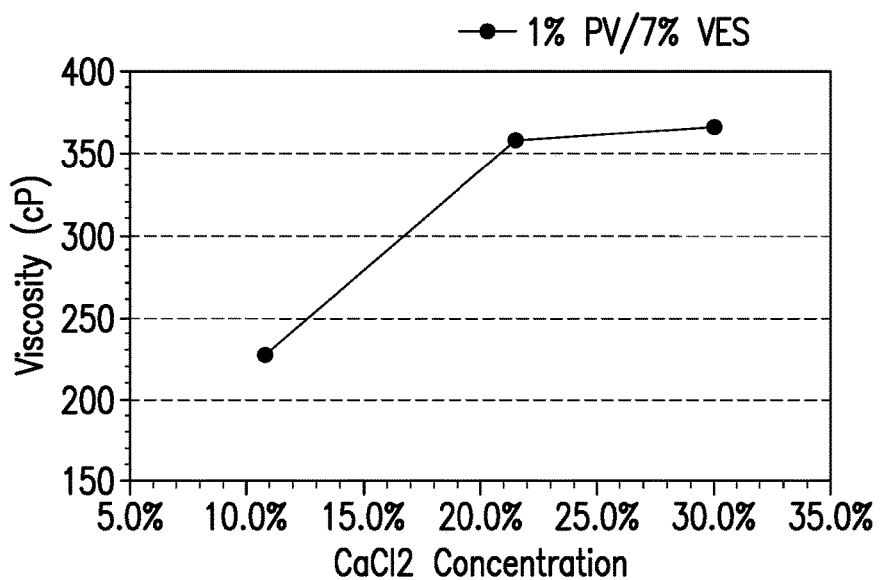
FIG. 4 is a graph illustrating the effect of the amount of $CaCl_2$) on the viscosity of VES fluids containing 7 wt. % of a VES surfactant and 1 wt. % of a cationic polymer additive in sea water, measured at 300° F. under constant shear rate of 100 1/s.

Examples 7-9 show the effect of reducing the amount of $CaCl_2$ in the fluid on the fluid viscosity. The amount of the VES and cationic polymer additive were kept constant at 7 wt. % and 1 wt. % respectively, and the amount of $CaCl_2$ was 10, 20 and 30 wt. %. The formulations and the results are shown in Table 2. The results are also illustrated graphically in FIG. 3 and FIG. 4.

TABLE 2

|  | VES (vol. %) | Cationic polymer additive (wt. %) | $CaCl_2$ (wt. %) | Viscosity (cP) |
|---|---|---|---|---|
| Ex 7 | 7 | 1 | 30 | 366 |
| Ex 8 | 7 | 1 | 20 | 358 |
| Ex 9 | 7 | 1 | 10 | 227 |

The results shown that reducing the $CaCl_2$ concentration from 30% to 20% did not lead to any significant difference in viscosity behavior of the fluid. During the initial 30 minutes after attaining 300° F., the fluid with higher percentage of $CaCl_2$ seemed to have slightly higher viscosity. Without wishing to be bound by theory, it is believed that the added cationic polymer additive is able to compensate the decrease in calcium ions in the solution to stabilize the wormlike micelles responsible for the gelling.

On further decreasing the amount of $CaCl_2$ to 10%, the viscosity after 1 h at 300° F. and 100 1/s shear rate decreases from 358 cP to 227 cP.

Examples 10-11

Figure 5:
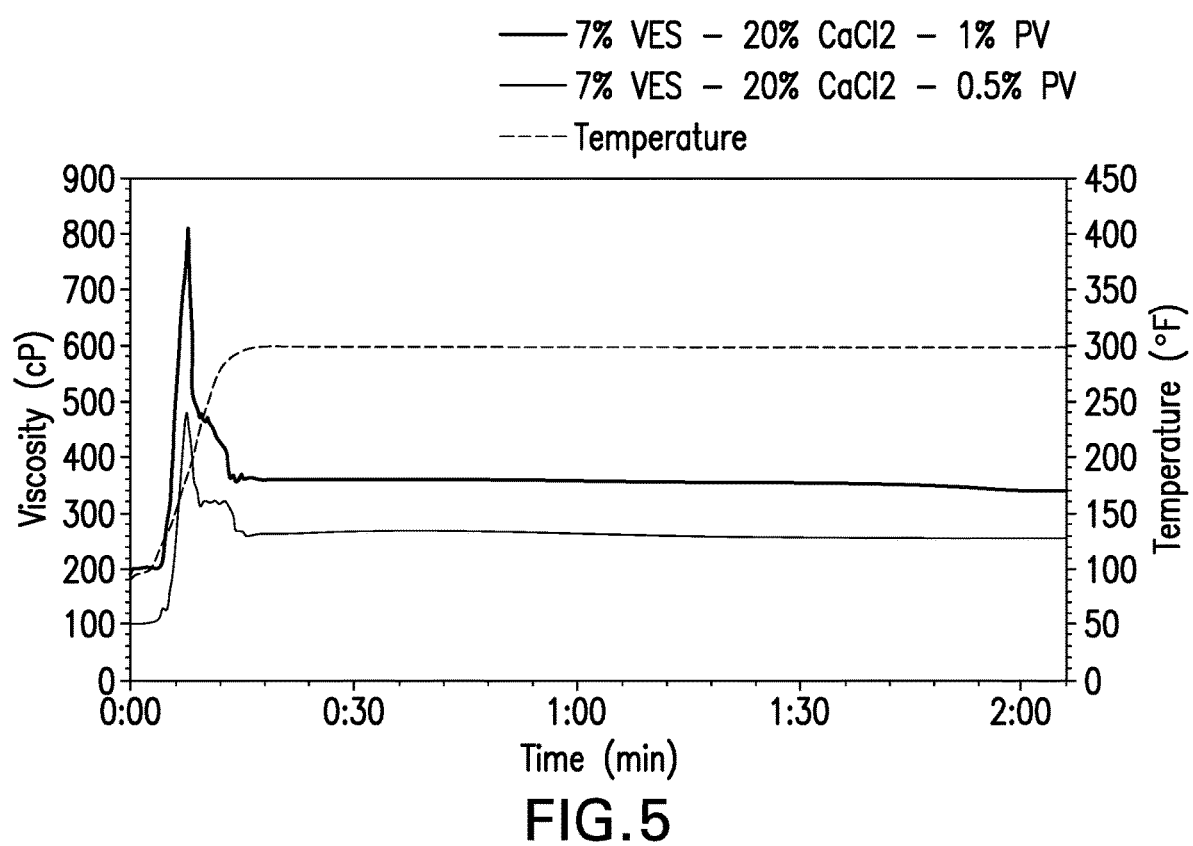
FIG. 5 is a graph illustrating the viscosity profiles of VES fluids containing 7 wt. % of a VES surfactant, 20 wt. % of $CaCl_2$, and 1 wt. % or 0.5 wt. % of a cationic polymer additive in sea water, measured at 300° F. under constant shear rate of 100 1/s.

Examples 10-11 show the effect of the amount of the cationic polymer additive on the viscosity of the VES fluids. The formulations and the results are shown in Table 3. The results are also illustrated graphically in FIG. 5.

TABLE 3

|  | VES (vol. %) | Cationic polymer additive (wt. %) | $CaCl_2$ (wt. %) | Viscosity (cP) |
|---|---|---|---|---|
| Ex 10 | 7 | 1 | 20 | 358 |
| Ex 11 | 7 | 0.5 | 20 | 295 |

The data shows that the viscosity value reduced from approximately 360 cP to 260 cP when the amount of the cationic polymer additive is decreased from 1 wt. % to 0.5 wt. %. Based on the above experimental data, it can be observed that, compared to base VES fluid with 9.5 wt. % VES and 30 wt. % $CaCl_2$) in sea water, addition of 1 wt. % of a cationic polymer additive as disclosed herein can reduce the required VES volume by more than 25% or reduce the required $CaCl_2$) amount by 33%.

In conclusion, adding a small amount of a cationic polymer additive such as polydiallyldimethylammonium chloride that is stable at high temperature and high salinity can significantly enhance the rheological property of VES fluid. The enhancement is apparently occurring through the stabilization of the dynamic micellar structures due to electrostatic interactions between the cationic polymer and the anionic charges on the micellar surface. The use of such a polymer can therefore lead to significant cost savings because of achieving desired rheological properties with lesser quantity of VES and salt for the fluid formulation. Lesser chemicals used would also lead to lower impact on the environment.

Set forth below are various embodiments of the disclosure.

Embodiment 1

A viscoelastic surfactant treatment fluid comprising: an aqueous base fluid comprising an inorganic salt, the inorganic salt being present in an amount of greater than about 5 wt. % based on the total weight of the treatment fluid; a viscoelastic surfactant gelling agent effective to gel the aqueous base fluid by forming a plurality of micelles; and a cationic polymer additive associated with the micelles via electrostatic interactions.

Embodiment 2

The viscoelastic surfactant treatment fluid as in any prior embodiment, wherein the cationic polymer additive by itself does not gel the aqueous based fluid by forming micelles.

Embodiment 3

The viscoelastic surfactant treatment fluid as in any prior embodiment, wherein the cationic polymer additive comprises one or more of an amide, an amine, or a salt thereof.

Embodiment 4

The viscoelastic surfactant treatment fluid as in any prior embodiment, wherein the cationic polymer additive is a homopolymer or copolymer of a polyallylamine salt.

Embodiment 5

The viscoelastic surfactant treatment fluid as in any prior embodiment, wherein the cationic polymer additive is polydiallyldimethylammonium chloride.

Embodiment 6

The viscoelastic surfactant treatment fluid as in any prior embodiment, wherein the cationic polymer is present in an amount of about 0.1 wt. % to about 10 wt. % based on a total weight of the viscoelastic surfactant treatment fluid.

Embodiment 7

The viscoelastic surfactant treatment fluid as in any prior embodiment, wherein the viscoelastic surfactant treatment fluid comprises about 15 wt. % to about 50 wt. % of the inorganic salt based on the total weight of the viscoelastic surfactant treatment fluid.

Embodiment 8

The viscoelastic surfactant treatment fluid as in any prior embodiment, wherein the viscoelastic gelling agent is present in an amount of about 1 volume % to about 20 volume %, based on the total volume of the aqueous base fluid.

Embodiment 9

The viscoelastic surfactant treatment fluid as in any prior embodiment, wherein: the inorganic salt is present in an amount of about 15 wt. % to about 40 wt. % of calcium chloride in sea water based on the total weight of the viscoelastic surfactant treatment fluid; the viscoelastic surfactant gelling agent comprises one or more of erucamidopropyl hydroxypropyl sulfobetaine, erucamidopropyl hydroxyethyl sulfobetaine, or erucamidopropyl hydroxymethyl sulfobetaine, and is present in an amount of about 5 volume % to about 10 volume % based on the total volume of the aqueous base fluid; and the cationic polymer additive comprises polydiallyldialkylammonium salt and is present in an amount of about 0.1 wt. % to about 5 wt. %, based on the total weight of the viscoelastic surfactant treatment fluid.

Embodiment 10

The viscoelastic surfactant treatment fluid as in any prior embodiment, wherein the treatment fluid has a viscosity of about 50 to about 350 cP at 300° F. and 100 $s^{-1}$ using Chandler 5550 HPHT viscometer in accordance with API RP 13M.

Embodiment 11

A method of improving a rheological property of a viscoelastic surfactant treatment fluid, the method comprising: gelling an aqueous base fluid having greater than about 5 wt. % of an inorganic salt with a viscoelastic surfactant gelling agent to form a plurality of micelles; and contacting the plurality of micelles with a cationic polymer additive to form a viscoelastic surfactant treatment fluid having an improved rheological property at a temperature of greater than about greater than 200° F. as compared to an otherwise identical reference viscoelastic surfactant treatment fluid that does not contain the cationic polymer additive.

Embodiment 12

The method as in any prior embodiment, wherein gelling the aqueous base fluid comprises mixing the aqueous base fluid with the viscoelastic surfactant gelling agent at a temperature of about 20° F. to about 350° F.

Embodiment 13

The method as in any prior embodiment, wherein the improved rheological property is viscosity.

Embodiment 14

The method as in any prior embodiment, wherein the cationic polymer additive by itself does not gel the aqueous based fluid by forming micelles.

Embodiment 15

The method as in any prior embodiment, wherein the cationic polymer additive comprises one or more of an amide, an amine, or a salt thereof.

Embodiment 16

The method as in any prior embodiment, wherein the cationic polymer additive is a homopolymer or copolymer of a polyallylamine salt.

Embodiment 17

The method as in any prior embodiment, wherein the cationic polymer additive is polydiallyldimethylammonium chloride.

Embodiment 18

The method as in any prior embodiment, wherein the cationic polymer is present in an amount of about 0.1 wt. % to about 10 wt. % based on a total weight of the viscoelastic surfactant treatment fluid.

Embodiment 19

The method as in any prior embodiment, wherein the aqueous base fluid is a brine comprising about 15 wt. % to about 50 wt. % of the inorganic salt based on the total weight of the viscoelastic surfactant treatment fluid.

Embodiment 20

The method as in any prior embodiment, wherein the viscoelastic gelling agent is present in an amount of about 1 volume % to about 20 volume %, based on the total volume of the aqueous base fluid.

All ranges disclosed herein are inclusive of the endpoints, and the endpoints are independently combinable with each other. As used herein, "combination" is inclusive of blends, mixtures, alloys, reaction products, and the like. All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." The modifier "about" used in connection with a quantity is inclusive of the stated value and has the meaning dictated by the context (e.g., it includes the degree of error associated with measurement of the particular quantity).

What is claimed is:

1. A method of improving a rheological property of a viscoelastic surfactant treatment fluid, the method comprising:
   gelling an aqueous base fluid having greater than about 5 wt. % of an inorganic salt with a viscoelastic surfactant gelling agent to form a plurality of micelles, the viscoelastic surfactant gelling agent comprising one or more of erucamidopropyl hydroxypropyl sulfobetaine, erucamidopropyl hydroxyethyl sulfobetaine, or erucamidopropyl hydroxymethyl sulfobetaine; and
   contacting the plurality of micelles with a cationic polymer additive, which comprises polydiallyldialkylammonium salt, to form a viscoelastic surfactant treatment fluid having an improved rheological property at a temperature of greater than about 200° F. as compared to an otherwise identical reference viscoelastic surfactant treatment fluid that does not contain the cationic polymer additive,
   wherein the cationic polymer is present in an amount of about 0.1 wt. % to about 10 wt. % based on a total weight of the viscoelastic surfactant treatment fluid; and
   the viscoelastic gelling agent is present in an amount of about 1 volume % to about 20 volume %, based on the total volume of the aqueous base fluid wherein a viscosity of the viscoelastic surfactant treatment fluid changes less than 10% after exposing to an environment having a temperature of about 250° F. to about 350° F. for two hours when tested under the same conditions.

2. The method of claim 1, wherein gelling the aqueous base fluid comprises mixing the aqueous base fluid with the viscoelastic surfactant gelling agent at a temperature of about 20° F. to about 350° F.

3. The method of claim 1, wherein the improved rheological property is viscosity.

4. The method of claim 1, wherein the cationic polymer additive by itself does not gel the aqueous based fluid by forming micelles.

5. The method of claim 1, wherein the cationic polymer additive is polydiallyldimethylammonium chloride.

6. The method of claim 1, wherein the aqueous base fluid is a brine comprising about 15 wt. % to about 50 wt. % of the inorganic salt based on the total weight of the viscoelastic surfactant treatment fluid.

7. The method of claim 1, wherein the viscoelastic surfactant treatment fluid has a viscosity of about 50 to about 350 cP at 300° F. and 100 $s^{-1}$ using Chandler 5550 HPHT viscometer in accordance with API RP 13M.

8. The method of claim 1, wherein the viscoelastic surfactant treatment fluid has a viscosity of about 250 to about 350 cP at 300° F. and 100 $s^{-1}$ using Chandler 5550 HPHT viscometer in accordance with API RP 13M.

9. The method of claim 1, wherein the plurality of micelles have negative charges on a surface of the micelles.

10. The method of claim 1, wherein:
    the inorganic salt comprises calcium chloride and is present in an amount of about 15 wt. % to about 40 wt. % based on the total weight of the viscoelastic surfactant treatment fluid;
    the viscoelastic surfactant gelling agent is present in an amount of about 5 volume % to about 10 volume % based on the total volume of the aqueous base fluid; and
    the cationic polymer additive comprises polydiallyldialkylammonium salt and is present in an amount of about 0.1 wt. % to about 5 wt. %, based on the total weight of the viscoelastic surfactant treatment fluid.

11. The method of claim 10, wherein the viscoelastic surfactant comprises erucamidopropyl hydroxypropyl sulfobetaine.

12. The method of claim 10, wherein the cationic polymer additive is present in an amount of about 0.1 wt. % to about 3 wt. %, based on the total weight of the viscoelastic surfactant treatment fluid.

13. The method of claim 10, wherein the inorganic salt comprises calcium chloride and is present in an amount of about 20 wt. % to about 40 wt. % based on the total weight of the viscoelastic surfactant treatment fluid.

14. The method of claim 1, wherein:
    the inorganic salt comprises calcium chloride and is present in an amount of about 20 wt. % to about 40 wt. % based on the total weight of the viscoelastic surfactant treatment fluid;
    the viscoelastic surfactant gelling agent comprises erucamidopropyl hydroxypropyl sulfobetaine and is present in an amount of about 5 volume % to about 10 volume % based on the total volume of the aqueous base fluid; and
    the cationic polymer additive comprises polydiallyldialkylammonium salt and is present in an amount of about 0.1 wt. % to about 3 wt. %, based on the total weight of the viscoelastic surfactant treatment fluid.

* * * * *